US009796439B2

(12) United States Patent
Bojanowski et al.

(10) Patent No.: US 9,796,439 B2
(45) Date of Patent: Oct. 24, 2017

(54) METHOD FOR COUPLING A SUNROOF GLASS APPARATUS TO A VEHICLE BODY

(71) Applicant: GM GLOBAL TECHNOLOGY OPERATIONS LLC, Detroit, MI (US)

(72) Inventors: Gerald M. Bojanowski, Washington Township, MI (US); James A. Forbes, Ortonville, MI (US); Craig D. Schroeder, Wyandotte, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 539 days.

(21) Appl. No.: 14/527,078

(22) Filed: Oct. 29, 2014

(65) Prior Publication Data
US 2016/0121949 A1  May 5, 2016

(51) Int. Cl.
*B62D 65/06* (2006.01)
*B62D 65/02* (2006.01)
*B60J 7/043* (2006.01)

(52) U.S. Cl.
CPC ............ *B62D 65/06* (2013.01); *B60J 7/043* (2013.01); *B62D 65/026* (2013.01)

(58) Field of Classification Search
CPC ......... B62D 65/06; B62D 65/026; B60J 7/043
See application file for complete search history.

(56) References Cited

U.S. PATENT DOCUMENTS

| 6,481,078 | B1* | 11/2002 | Stone | B62D 65/06 29/252 |
| 2004/0237291 | A1* | 12/2004 | Kim | B62D 65/06 29/700 |
| 2012/0102711 | A1* | 5/2012 | Ali | B23P 19/10 29/429 |

FOREIGN PATENT DOCUMENTS

| CN | 1651298 A | 8/2005 |
| CN | 101962045 A | 2/2011 |
| CN | 201980321 U | 9/2011 |
| EP | 1914097 A2 | 4/2008 |

* cited by examiner

Primary Examiner — Moshe Wilensky
(74) Attorney, Agent, or Firm — Quinn IP Law

(57) ABSTRACT

A method for coupling a sunroof glass apparatus includes the following steps: (a) moving a fixture toward a roof portion of a vehicle body in order to insert a plurality of pins of the fixture into locating holes formed in the vehicle body; (b) coupling net plates to the arms of an actuating mechanism of the sunroof assembly; (c) decoupling the fixture from the net plates while maintaining the net plates coupled to the arms of the actuating mechanism; and (d) coupling the flanges of the sunroof glass apparatus to arms of the actuating mechanism via the net plates in order to movably couple the sunroof glass apparatus to the vehicle body. In another embodiment, the presently disclosed method may additionally include coupling the net plates to the fixture before moving the fixture toward the roof portion of the vehicle body.

20 Claims, 1 Drawing Sheet

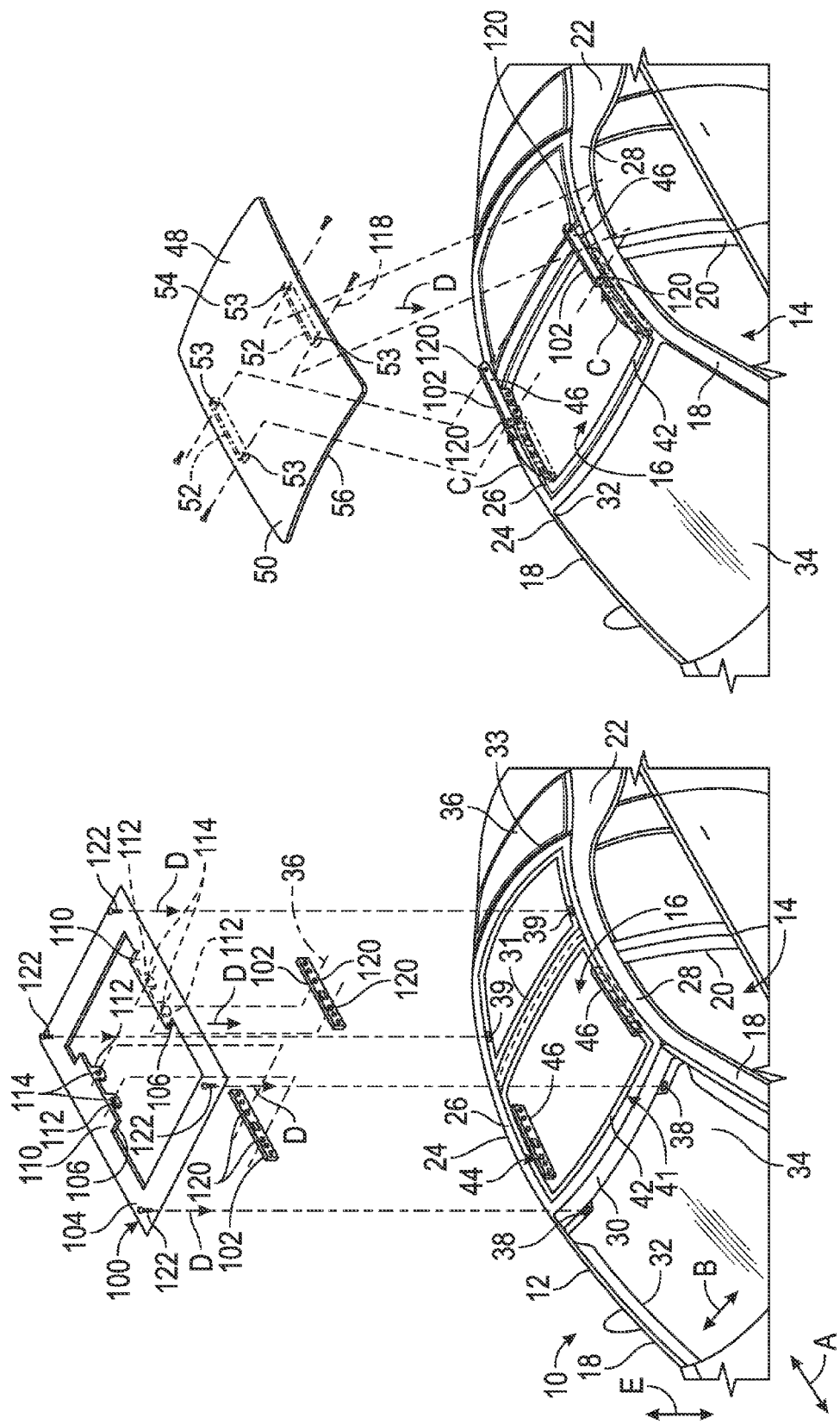

METHOD FOR COUPLING A SUNROOF GLASS APPARATUS TO A VEHICLE BODY

TECHNICAL FIELD

The present disclosure relates to a method for coupling a sunroof glass apparatus to a vehicle body.

BACKGROUND

Some vehicles are designed with a sunroof cooperating with a passenger compartment. Generally, the sunroof includes a glass component that is movable to selectively uncover an opening in the roof of the vehicle. To attach the sunroof to the vehicle, whether in a top load operation or a bottom load operation, the entire sunroof assembly, including a frame and the glass component, are installed in the vehicle as a single unit.

SUMMARY

It is useful to develop a method for coupling a sunroof glass apparatus to a vehicle body, wherein the sunroof glass apparatus is larger than the sunroof aperture formed in the roof portion of the vehicle body. In this case, instead of installing the entire sunroof assembly, including a frame and a glass component, in the vehicle as a single unit, it is useful to develop a method for coupling the sunroof glass apparatus to a vehicle body when the frame of the sunroof assembly has already been coupled to the vehicle body.

In an embodiment, the presently disclosed method includes the following steps: (a) moving a fixture toward a roof portion of a vehicle body in order to insert a plurality of pins of the fixture into locating holes formed in the vehicle body, wherein a plurality of net plates are coupled to the fixture; (b) coupling net plates to the arms of an actuating mechanism of the sunroof assembly, wherein the arms are movably coupled to the vehicle body; (c) decoupling the fixture from the net plates while maintaining the net plates coupled to the arms of the actuating mechanism; and (d) coupling the flanges of the sunroof glass apparatus to arms of the actuating mechanism via the net plates in order to movably couple the sunroof glass apparatus to the vehicle body. In another embodiment, the presently disclosed method may additionally include coupling the net plates to the fixture before moving the fixture toward the roof portion of the vehicle body.

The above features and advantages and other features and advantages of the present teachings are readily apparent from the following detailed description of the best modes for carrying out the teachings when taken in connection with the accompanying drawings.

BRIEF DESCRIPTION OF THE DRAWINGS

FIG. 1 is a schematic fragmentary, perspective view of a vehicle body and a fixture moving toward the vehicle body; and FIG. 2 is a schematic fragmentary, perspective view of a sunroof glass apparatus being coupled to the vehicle body.

DETAILED DESCRIPTION

Referring to the drawings, wherein like reference numbers correspond to like or similar components throughout the several figures, and beginning with FIG. 1, the present disclosure describes a method of coupling a sunroof glass apparatus 48 (FIG. 2) to a vehicle body 12 of a vehicle 10. Although FIG. 1 illustrates a car, the vehicle 10 may be any other type of automotive or non-automotive vehicle. The vehicle 10 includes a vehicle body 12 defining a passenger compartment 14. The vehicle body 12 defines a sunroof opening 16 leading to the passenger compartment 14. The sunroof opening 16 allows sunlight to reach the passenger compartment 14.

The vehicle body 12 includes a roof portion 24 and A-pillars 18, B-pillars 20, and C-pillars 22 supporting the roof portion 24. The roof portion 24 of the vehicle body 12 includes a first rail 26 and a second rail 28 interconnecting the A-pillars 18, B-pillars 20, and C-pillars 22. The first rail 26 and second rail 28 extend along the fore-aft direction indicated by double arrows A. In addition, the roof portion 24 includes a first brace 30, a second brace 31, and a third brace 33 between the first rail 26 and second rail 28. Each of the first brace 30, the second brace 31, and the third brace 33 extends along the cross-car direction indicated by double arrows B. The cross-car direction indicated by double arrows B is perpendicular to the fore-aft direction indicated by double arrows A. Further, the first brace 30, the second brace 31, and the third brace 33 are spaced apart from one another along the fore-aft direction indicate by double arrows A.

The A-pillars and the first brace 30 partly define a windshield opening 32. The windshield opening 32 is configured, shaped, and sized to receive a windshield 34. Aside from the windshield 34, the vehicle 10 includes at least one rear glass 36. In the depicted embodiment, the vehicle 10 includes two rear glasses 36. The rear glasses 36 are supported by the C-pillars 22, the second brace 31, and the third brace 33.

To facilitate engagement with a fixture 100, the vehicle 10 includes a plurality of front locating holes 38 formed in the first brace 30. In the depicted embodiment, the vehicle body 12 has two front locating holes 38 spaced apart from each other along the cross-car direction indicated by double arrows B. It is contemplated, however, that the vehicle body 12 may include more than two front locating holes 38. The vehicle body 12 also includes rear locating holes 39 formed in the first rail 26 and the second rail 28. The rear locating holes 39 are closer to the second brace 31 than to the first brace 30 and the third brace 33. The front locating holes 38 and the rear locating holes 39 are collectively referred to as the locating holes.

The vehicle 10 further includes a sunroof frame 42 coupled to the vehicle body 12. Specifically, the sunroof frame 42 is coupled to the roof portion 24 of the vehicle body 12 along the sunroof opening 16. The sunroof frame 42 is part of a sunroof assembly 41. The sunroof assembly 41 further includes an actuating mechanism 44 coupled to the sunroof frame 42. The actuating mechanism 44 has a plurality of arms 46 movably coupled to the sunroof frame 42. The arms 46 are coupled to a sunroof glass apparatus 48 (FIG. 2) and can therefore move the sunroof glass apparatus 48 relative to the vehicle body 12. Specifically, the sunroof glass apparatus 48 includes a glass 50 and a plurality of flanges 52 coupled to the glass 50. The glass 50 has a first or top glass surface 54 and a second or bottom surface 56 opposite the first glass surface 54. The flanges 52 are coupled to the second glass surface 56 of the glass 50. Each flange 52 has at least one flange hole 53 configured, shaped, and sized to receive a fastener 118. As discussed in detail below, the fasteners 118 can be inserted through the flange holes 53 and the plate holes 120 in order to couple the sunroof glass apparatus 48 to the net plates 102.

In operation, upon actuation of the actuating mechanism 44, the arms 46 can move relative to the vehicle body 12 between a closed position (FIG. 1) and an open position (FIG. 2) in the direction indicated by arrows C (FIG. 2). When the arms 46 are in the closed position, the sunroof glass apparatus 48 (FIG. 2) covers the sunroof opening 16. When the arms 46 are in the closed position, the sunroof glass apparatus 48 does not cover the sunroof opening 16. Thus, the arms 46 are movably coupled to the vehicle body 12.

With reference to FIG. 1, as discussed above, the present disclosure describes a method for coupling the sunroof glass apparatus 48 to the vehicle body 12 using the fixture 100 and a plurality of net plates 102. The fixture 100 includes a fixture frame 104 and a plurality of pins 122 extending downwardly from the fixture frame 104. In the depicted embodiment, the fixture 100 includes four pins 122 located at the corners of the fixture frame 104. Each pin 122 is configured, shaped, and sized to be disposed in the front locating holes 38 and the rear locating holes 39 in order to locate the fixture 100 relative to the vehicle body 12.

The fixture 100 additionally includes a plurality of frame flanges 106 extending inwardly from the fixture frame 104. Each frame flange 106 includes a flange body 110 and a plurality of extensions 112 protruding downwardly from the flange body 110. The frame flanges 106 define fixture holes 114 extending through each extension 112. Each fixture hole 114 is configured, shaped, and sized to receive a fastener 118 (FIG. 2), such as a bolt or a screw. The fastener 118 can be used to couple the fixture 100 to the net plates 102. Specifically, the fasteners 118 can be inserted through the fixture holes 114 and through the net plates 102 in order to couple the fixture 100 to the net plates 102.

The net plates 102 are used to couple the fixture 100 to the arms 46 of the actuating mechanism 44 and each has a plurality of plate holes 120. Each plate hole 120 is configured, shaped, and sized to receive a fastener 118. The fasteners 118 can be inserted through the plate holes 120 and the fixture holes 114 in order to couple the fixture 100 to the net plates 102. As discussed above, the net plates 102 can also be coupled to the arms 46 of the actuating mechanism 44.

In order to couple the sunroof glass apparatus 48 to the vehicle body 12 at the appropriate location, the presently disclosed method can be employed. The method begins by coupling the net plates 102 to the fixture frame 104. Specifically, each net plate 102 should be coupled to the one of the frame flanges 106 as shown in FIG. 1. To do so, fasteners 118 can be inserted through the plate holes 119 of the net plates 102 and the fixture holes 114 of the frame flanges 106.

After coupling the net plates 102 to the frame flanges 106, the fixture 100 is moved downwardly in the direction indicated by arrow D toward the roof portion 24 of the vehicle body 12. This is a top loading process. The fixture 100 should be moved toward the vehicle body 12 until the pins 122 are inserted into the front locating holes 38 and the rear locating holes 39 in order to locate the fixture 100 relative to the vehicle body 12 along the fore-aft direction indicated by double arrows A and a vertical direction indicated by double arrows E. The vertical direction indicated by double arrows E may be referred to as the up-down direction and is perpendicular to the fore-aft direction indicated by double arrow A and the cross-car direction indicated by double arrow B.

After the pins 122 are disposed in the front locating holes 38 and the rear locating holes 39, the net plates 102 (which are coupled to the fixture 100) are coupled to the arms 46 of the actuating mechanism 44. To do so, the fasteners 118, such as bolts, can be inserted through the net plates 102 and the arms 46 of the actuating mechanism 44 while the arms 46 are in the closed position as shown in FIG. 1. Then, the net plates 102 are decoupled from the fixture 100 while the net plates 102 remain coupled to the arms 46 of the actuating mechanism 44. To decouple the net plates 102 from the fixture 100, the fasteners 118 may be withdrawn from the fixture 100 and the net plates 102. After decoupling the net plates 102 from the fixture 100, the fixture 100 is withdrawn from the vehicle body 12. In other words, the fixture 100 is moved away from the vehicle body 12.

Next, the arms 46 of the actuating mechanism 44 may be optionally moved from the closed position (FIG. 1) to the open position (FIG. 2) while the net plates 102 remain coupled to the arms 46. Moving the arms 46 to the open position (FIG. 2) may facilitate assembling the sunroof glass apparatus 48 to the vehicle body 12.

Once the arms 46 are in the open position as shown in FIG. 2, the sunroof glass apparatus 48 is moved downwardly toward the roof portion 24 of the vehicle body 12 in the direction indicated by arrow D. While the sunroof glass apparatus 48 moves toward the roof portion 24, the second glass surface 56 should face toward the vehicle body 12 and the first glass surface 54 should face away from the vehicle body 12. The sunroof glass apparatus 48 should be moved toward the roof portion 24 until the flange holes 53 are substantially aligned with the plate holes 120 in order to allow fasteners 118 to be inserted through the plate holes 120 and flange holes 53. In other words, the sunroof glass apparatus 48 should be moved toward the vehicle body 12 in order to substantially align the flanges 52 with the net plates 102. Then, fasteners 118 are inserted through the net plates 102, the arms 46, and the flanges 52 in order to couple the sunroof glass apparatus 48 to the arms 46 of the actuating mechanism 44. At this juncture, the sunroof glass apparatus 48 is movably coupled to the vehicle body 12 via the arms 46 of the actuating mechanism 44.

While the best modes for carrying out the teachings have been described in detail, those familiar with the art to which this disclosure relates will recognize various alternative designs and embodiments for practicing the teachings within the scope of the appended claims.

The invention claimed is:

1. A method of coupling a sunroof glass apparatus to a vehicle body, the method comprising:
    moving a fixture toward a roof portion of the vehicle body in order to insert a plurality of pins of the fixture into locating holes formed in the vehicle body, wherein a plurality of net plates are coupled to the fixture;
    coupling the net plates to a plurality of arms of a sunroof assembly, wherein the arms are movably coupled to the vehicle body;
    decoupling the fixture from the net plates while maintaining the net plates coupled to the arms; and
    coupling flanges of the sunroof glass apparatus to the net plates that are attached to arms of the sunroof assembly in order to movably couple the sunroof glass apparatus to the vehicle body.

2. The method of claim 1, further comprising moving the arms from a closed position to an open position before coupling the flanges of the sunroof glass apparatus to the arms of an actuating mechanism.

3. The method of claim 2, wherein the net plates are coupled to the arms of the actuating mechanism while the arms are in the closed position.

4. The method of claim 1, further comprising coupling the net plates to the fixture before moving the fixture toward the roof portion of the vehicle body.

5. The method of claim 1, further comprising moving the fixture away from the vehicle body after decoupling the fixture from the net plates.

6. The method of claim 1, wherein the roof portion includes a brace partially defining a windshield opening, and at least two of the locating holes are formed in the brace.

7. The method of claim 1, wherein the roof portion includes a first rail and a second rail, and the at least two of the locating holes are formed in the first rail and the second rail.

8. The method of claim 1, wherein the sunroof glass apparatus includes a plurality of flanges and a glass having a first glass surface and a second glass surface opposite the first glass surface, the flanges are coupled to the second glass surface, and the method further comprises moving the sunroof glass apparatus toward the roof portion while the second glass surface faces the vehicle body until the flanges are substantially aligned with the net plates that are coupled to the arms of an actuating mechanism.

9. The method of claim 8, wherein coupling the flanges of the sunroof glass apparatus to the arms of the actuating mechanism via the net plates includes inserting fasteners through the net plates, the arms, and the flanges.

10. The method of claim 9, further comprising coupling the net plates to the fixture before moving the fixture toward the roof portion of the vehicle body.

11. A method of coupling a sunroof glass apparatus to a vehicle body, the vehicle body having a plurality of locating holes, the method comprising:
coupling a plurality of net plates to a fixture, wherein the fixture includes a fixture frame and a plurality of pins extending from the fixture frame;
moving the fixture toward a roof portion of the vehicle body in order to insert the pins into the plurality of locating holes, wherein the plurality of locating holes are formed in the roof portion of the vehicle body, and a frame of a sunroof assembly is coupled to the vehicle body;
coupling the plurality of net plates to a plurality of arms of the sunroof assembly, wherein the arms are movably coupled to the frame of the sunroof assembly before the net plates are coupled to the arms;
decoupling the fixture from the net plates while maintaining the net plates coupled to the arms; and
coupling flanges of the sunroof glass apparatus to the arms via the net plates in order to movably couple the sunroof glass apparatus to the vehicle body.

12. The method of claim 11, wherein the fixture includes a frame flange protruding from the fixture frame, and coupling the plurality of net plates to the fixture includes coupling each net plate to one of the frame flanges.

13. The method of claim 12, wherein the locating holes include front locating holes and rear locating holes, the front locating holes are formed in a brace of the vehicle body that partially defines a windshield opening, and moving the fixture toward the roof portion of the vehicle body includes inserting at least some of the pins in the front locating holes.

14. The method of claim 13, wherein the vehicle body includes a first rail and a second rail interconnecting the frame, and the rear locating holes are formed in the first rail and the second rail, and moving the fixture toward the roof portion of the vehicle body includes inserting at least some of the pins in the rear locating holes.

15. The method of claim 11, further comprising moving the arms of an actuating mechanism from a closed position to an open position before coupling the flanges of the sunroof glass apparatus to the net plates.

16. The method of claim 15, wherein the net plates are coupled to the arms of the actuating mechanism while the arms are in the closed position.

17. The method of claim 11, further comprising coupling the net plates to the fixture before moving the fixture toward the roof portion of the vehicle body.

18. The method of claim 11, further comprising moving the fixture away from the vehicle body after decoupling the fixture from the net plates.

19. The method of claim 11, wherein the sunroof glass apparatus includes a plurality of flanges and a glass having a first glass surface and a second glass surface opposite the first glass surface, the flanges are coupled to the second glass surface, and the method further comprises moving the sunroof glass apparatus toward the roof portion while the second glass surface faces the vehicle body until the flanges are substantially aligned with the net plates that are coupled to the arms of the actuating mechanism.

20. The method of claim 19, wherein coupling the flanges of the sunroof glass apparatus to the arms of the actuating mechanism via the net plates includes inserting fasteners through the net plates, the arms, and the flanges.

* * * * *